US006317551B1

(12) United States Patent
Mitchell et al.

(10) Patent No.: US 6,317,551 B1
(45) Date of Patent: Nov. 13, 2001

(54) OPTICAL WAVEGUIDE HAVING NEGATIVE DISPERSION AND LARGE AEFF

(75) Inventors: Brian E. Mitchell; David K. Smith, both of Wilmington, NC (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/604,498

(22) Filed: Jun. 27, 2000

Related U.S. Application Data

(60) Provisional application No. 60/145,759, filed on Jul. 27, 1999, and provisional application No. 60/165,833, filed on Nov. 16, 1999.

(51) Int. Cl.[7] ................................................ G02B 6/02
(52) U.S. Cl. ................................... 385/124; 385/126
(58) Field of Search ............................. 385/123, 126–128

(56) References Cited

U.S. PATENT DOCUMENTS

| 4,715,679 | 12/1987 | Bhagavatula | 350/96.33 |
|---|---|---|---|
| 4,852,968 | 8/1989 | Reed | 350/96.33 |
| 5,278,931 | 1/1994 | Antos et al. | 385/126 |
| 5,448,674 | 9/1995 | Vengsarkar et al. | 385/123 |
| 5,553,185 | 9/1996 | Antos et al. | 385/127 |
| 5,684,909 | * 11/1997 | Liu | 385/127 |
| 5,721,800 | 2/1998 | Kato et al. | 385/127 |
| 5,781,684 | * 7/1998 | Liu | 385/124 |
| 5,852,701 | 12/1998 | Kato et al. | 385/127 |
| 6,072,929 | 6/2000 | Kato et al. | 385/123 |

FOREIGN PATENT DOCUMENTS

| 0 721 119 | 7/1996 | (EP) . |
|---|---|---|
| 0 724 171 | 7/1996 | (EP) . |
| 0 909 694 | 4/1999 | (EP) . |
| WO 97/33188 | 9/1997 | (WO) . |

OTHER PUBLICATIONS

Liu et al., "Single–Mode Dispersion–Shifted Fibers with Effective Area Larger Than 80 $\mu m^2$ and Good Bending Performance", Proceedings of the European Conference on Optical Communication, vol. 1, Sep. 17, 1995, pp. 333–336.
Lemrow et al., "Advanced Single Mode Fiber Design", Telephony, May 20, 1985, pp. 48–50, 54, 58, 62,66.

* cited by examiner

Primary Examiner—Rodney Bovernick
Assistant Examiner—Michelle R. Connelly-Cushwa
(74) Attorney, Agent, or Firm—William J. Chervenak

(57) ABSTRACT

The invention is directed to a single mode optical waveguide fiber profile that provides relatively large effective area while limiting macrobend loss. The large effective area results from configuring the core of the waveguide fiber to shift propagated light power away from the waveguide center. Macrobend loss, as measured by pin array or 20 mm mandrel testing, is maintained low by means of a power-limiting index depression surrounding the central core region of the waveguide. In addition, low attenuation is achieved and cut off wavelength is controlled to provide a telecommunications operating window in the wavelength range of about 1250 nm to 1700 nm.

40 Claims, 4 Drawing Sheets

OPTICAL WAVEGUIDE HAVING NEGATIVE DISPERSION AND LARGE AEFF

This application claims the benefit of U.S. Provisional Patent Application No. 60/145,759, filed Jul. 27, 1999 and U.S. Provisional Application No. 60/165,833, filed Nov. 16, 1999.

BACKGROUND OF THE INVENTION

1. Field of the Invention

The present invention relates generally to optical waveguide fibers having improved resistance to bending, and particularly to waveguide fibers having large effective area, and negative total dispersion in the 1550 nm operating window, and improved resistance to macro-bend and micro-bend 2. Technical Background A waveguide having large effective area reduces non-linear optical effects, including self phase modulation, four wave mixing, cross phase modulation, and non-linear scattering processes, which can cause degradation of signals in high power systems. In general, a mathematical description of these non-linear effects includes the ratio, $P/A_{eff}$, where P is light power. For example, a non-linear optical effect can follow an equation containing a term, $\exp[PxL_{eff}/A_{eff}]$, where $L_{eff}$ is effective length. Thus, an increase in $A_{eff}$ produces a decrease in the non-linear contribution to the degradation of a light signal propagating in the waveguide.

The requirement in the telecommunication industry for greater information capacity over long distances, without regenerators, has led to a reevaluation of single mode fiber refractive index profile design.

The focus of this reevaluation has been to provide optical waveguides that reduce non-linear effects such as those noted above and are optimized for the lower attenuation operating wavelength range around 1550 nm, i.e., the range from about 1250 nm to 1700 nm. In addition the waveguide should be compatible with optical amplifiers, and, retain the desirable properties of optical waveguides now deployed, such as, high strength, fatigue resistance, and bend resistance.

A waveguide fiber having at least two distinct refractive index segments has been found to have sufficient flexibility to meet or exceed the criteria for a high performance waveguide fiber system. The genera of segmented core designs are disclosed in detail in U.S. Pat. No. 4,715,679, Bhagavatula.

The effective area of a waveguide is in general increased by designing refractive index profiles that cause the light power distribution in the fiber to be shifted outwardly from the centerline of the waveguide fiber, thus reducing the power density. In moving the power distribution outwardly toward the core edge, however, the waveguide is made more susceptible to power losses due to bending of the fiber.

Bending losses have been found to occur in the cabling process as well as in the installation process. In some waveguide fiber uses, at least a part of the waveguide is installed as a coil, for example, in a junction box.

Thus there is a need for an optical waveguide fiber that reduces the non-linear term of refractive index by increasing effective area, $A_{eff}$, while maintaining a desired resistance to macrobend and microbend.

Definitions

The following definitions are in accord with common usage in the art.

The refractive index profile is the relationship between refractive index and waveguide fiber radius.

A segmented core is one that is divided into at least a first and a second waveguide fiber core portion or segment. Each portion or segment is located along a particular radial length, is substantially symmetric about the waveguide fiber centerline, and has an associated refractive index profile.

The radii of the segments of the core are defined in terms of the respective refractive indexes at respective beginning and end points of the segments. The definitions of the radii used herein are explained with reference to FIG. 1. In FIG. 1 the radius of the center index segment 10, is the length 2 that extends from the waveguide centerline to the point at which the profile becomes the α-profile of segment 12, that is, the point at which the refractive index versus radius curve begins to follow the equation, set forth below, for an α-profile. The outer radius 4 of segment 12 extends from the centerline to the radial point at which the extrapolated descending portion of the α-profile crosses the extrapolated extension of profile segment 14. This definition is readily applied to alternative center segments such as α-profiles or step index profiles. Further, the definition is readily applied to those cases wherein the second segment has a shape other than that of an α-profile. In cases where alternative center segment shapes are used, the radii are illustrated in a separate drawing. The radius 6 of segment 14 extends from the centerline to the radius point at which the Δ % is half the maximum value of the Δ % of segment 16. The radii of additional segments are defined analogously to that of segment 14 until reaching the final core segment. The midpoint radius 8 of segment 16, the final segment of the core as illustrated in FIG. 1, is measured from the centerline to the midpoint of the width of the segment. The width of a segment such as segment 16 extends between the two half Δ % values at the opposing portions of segment 16. The clad layer of the fiber is shown as 17 in FIG. 1.

The definitions set forth herein are in accord with a computer model that was used to predict functional waveguide properties given a refractive index profile. The model can also be used in the inverse to provide a family of refractive index profiles that will have a pre-selected set of functional properties.

The effective area is $$A_{eff}=2\pi(\int E^2 \, r \, dr)^2/(\int E^4 \, r \, dr),$$

where the integration limits are 0 to ∞, and E is the electric field associated with light propagated in the waveguide. An effective diameter, $D_{eff}$, may be defined as, $$A_{eff}=\pi(D_{eff}/2)^2.$$

The relative refractive index percent, $\Delta \% = 100 \times (n_i^2 - n_c^2)/2n_i^2$, where $n_i$ is the maximum refractive index in region i, unless otherwise specified, and $n_c$, is the average refractive index of the cladding region unless otherwise specified.

The term α-profile refers to a refractive index profile, expressed in terms of Δ(b)%, where b is radius, which follows the equation, $$\Delta(b)\%=\Delta(b_o)(1-[|b-b_o|]/(b_1-b_o)]^\alpha),$$

where $b_o$ is the point at which Δ(b)% is maximum, $b_1$ is the point at which Δ(b)% is zero, and b is in the range $b_i \leq b \leq b_f$, where delta is defined above, $b_i$ is the initial point of the α-profile, $b_f$ is the final point of the α-profile, and a is an exponent which is a real number. The initial and final points of the α-profile are selected and entered into the computer model. As used herein, if an Δ-profile is preceded by a step index profile or any other profile shape, the beginning point of the Δ-profile is the intersection of the α-profile and the step or other profile.

In the model, in order to bring about a smooth joining of the α-profile with the profile of the adjacent profile segment, the equation is rewritten as;

$$\Delta(b)\% = \Delta(b_a) + [\Delta(b_o) - \Delta(b_a)]\{(1-[|b-b_o|/(b_1-b_o)]^a)\},$$

where $b_A$ is the first point of an adjacent segment.

The pin array bend test is used to compare relative resistance of waveguide fibers to bending. To perform this test, attenuation loss is measured for a waveguide fiber with essentially no induced bending loss. The waveguide fiber is then woven about the pin array and attenuation again measured. The loss induced by bending is the difference between the two attenuation measurements. The pin array is a set of ten cylindrical pins arranged in a single row and held in a fixed vertical position on a flat surface. The pin spacing is 5 mm, center to center. The pin diameter is 0.67 mm. The waveguide fiber is caused to pass on opposite sides of adjacent pins. During testing, the waveguide fiber is placed under a tension just sufficient to make the waveguide conform to a portion of the periphery of the pins.

Alternate bend tests include wrapping of the fiber around one or more mandrels of pre-selected radius. In this application, a macrobend test used is the loss induced by one turn of the waveguide about a 20 mm diameter mandrel.

Another bend test referenced herein is the lateral load test. In this microbend test a prescribed length of waveguide fiber is placed between two flat plates. A #70 wire mesh is attached to one of the plates. (The market code #70 mesh is descriptive of screen made of wire having a diameter of 0.178 mm. The screen openings are squares of side length 0.185 mm.) A known length of waveguide fiber is sandwiched between the plates and a reference attenuation is measured while the plates are pressed together with a force of 30 newtons. A 70 newton force is then applied to the plates and the increase in attenuation in dB/m is measured. This increase in attenuation is the lateral load attenuation of the waveguide.

SUMMARY OF THE INVENTION

One aspect of the present invention is a single mode optical waveguide fiber having a segmented core, including a central region of the core having at least two segments surrounded by a power-limiting depression (PLD), and a surrounding clad layer. The power-limiting depression is the final core segment, which, therefore, is in contact with the clad layer. The relative index of the PLD is less than that of the core portion that forms the PLD inner boundary and less than that of the clad portion that forms the PLD outer boundary. The core and clad profiles, in particular the parameters defining the PLD profile are preferably selected to provide, at a wavelength of 1550 nm+/−10 nm, a power ratio no greater than about $1\times10^{-4}$, preferably no greater than about $5\times10^{-5}$, and more preferably no greater than about $5\times10^{-6}$, where the power ratio is the light power propagated in the waveguide at a radial position of 25 μm from the waveguide centerline divided by the light power propagated in the waveguide at a radial position of 10 μm from the centerline. The range of operating wavelengths is preferably about 1250 nm to 1700 nm. A more preferred range of operation is 1520 nm to 1650 nm. The inside radius of the PLD is preferably greater than about 12 μm. The radius drawn from the waveguide fiber centerline to the midpoint of the width of the PLD is preferably in the range of about 12.5 μm to 22 μm. The width of the PLD is in the range of about 0.75 μm to 13 μm and preferably in the range of about 3 μm to 10 μm.

The PLD width and relative index are preferably in the respective ranges of about 0.75 μm to 13 μm and −0.05% to −0.80%. It will be understood that the negative relative index of the PLD can be achieved by doping of the portions of the core and clad which form the boundaries of the PLD with an index increasing substance. Depending upon the choice of reference index, the relative index of the PLD could be made positive, but this is merely a mathematical convention and does not affect the index profile shape or function. More preferred PLD parameters are a width in the range of 3 μm to 10 μm and a relative index in the range of −0.2% to −0.8%. In practice the lower negative limit of the PLD relative index is usually dictated by what is possible rather than what is preferred. The PLD may also be characterized in terms of the area enclosed by the PLD and the horizontal axis of a refractive index profile chart. For example in the case where the PLD is a step index, the area enclosed is the width of the step multiplied by the depth of the step. Thus the preferred enclosed area associated with a step index, using the more preferred widths and relative indexes immediately above, is in the range of about 0.2 μm% (1 μm×0.2% magnitude of relative index) to 3.2 μm% (4 μm×0.8% magnitude of relative index).

In an embodiment of the invention, the core and clad refractive index profiles, including the configuration of the PLD, are chosen to provide an effective area of about 60 μm², while maintaining a fiber waveguide cut off wavelength in the range of about 1450 nm to 1900 nm. The cut off wavelength is reduced by about 200 nm or by as much as 1000 nm in the process of cabling. Thus the range 1450 nm to 1900 nm provides for single mode operation over the range of wavelengths above about 1500 nm. Attenuation of the waveguide herein disclosed is maintained at a level suited to high performance telecommunications systems. The attenuation for fibers made in accordance with the invention and designed for use in the preferred wavelength range 1520 nm to 1650 nm are measured at 1550 nm. However the relation between attenuation at 1550 nm and attenuation at other wavelengths in the preferred range is known in the art. Waveguide attenuation at 1550 nm for waveguides made in accordance with the invention is less than 0.25 dB/km and typically less than 0.22 dB/km. Attenuation at 1550 nm less than 0.20 dB/km has been measured for fibers having the profiles disclosed herein.

In a further embodiment of the invention, the central region of the core has three segments, each having a respective relative index (this relative index of a segment is the maximum relative index value for the segment unless otherwise stated) labeled $\Delta_o\%$ for the segment closest to the waveguide centerline, $\Delta_1\%$ for the second segment, counting outward from the centerline, and $\Delta_2\%$ for the third segment. The relative indexes are chosen such that $\Delta_o\% > \Delta_2\% > \Delta_1\%$. The respective profile shape of each of the segments including the PLD may be an Δ-profile, a step, a rounded step, a trapezoid or a rounded trapezoid. The rounding of profiles having sharp changes in slope is in general due to diffusion of dopant from a higher to a lower region of dopant concentration. Given the definition of the reference refractive index used herein, the profile embodiments will have a PLD relative index, $\Delta_p\%$, that is negative. As is stated above, the average refractive index of the clad layer is used as the reference index for calculating relative index. More detailed examples of this embodiment are set forth in the examples below.

In yet a further embodiment of the invention the central region of the core has four segments, each having a respective relative index (this relative index of a segment is the maximum relative index value for the segment unless otherwise stated) labeled $\Delta_0\%$ for the segment closest to the waveguide centerline, $\Delta_1\%$ for the second segment, counting outward from the centerline, $\Delta_2\%$ for the third segment, and $\Delta_3\%$ for the fourth segment. The relative indexes are chosen such that $\Delta_0\% > \Delta_2\% > \Delta_3\%$. Preferably $\Delta_1 \geq \Delta_3\%$. The third annular segment separates the higher index second annular segment from the PLD. This configuration has advantages with regard to manufacture of the waveguide fiber preform in that an interface between a germania doped region and a fluorine doped region is avoided, thereby suppressing the formation of interfacial air bubbles. The respective profile shape of each of the segments, including the PLD, may be an α-profile, a step, a rounded step, a trapezoid or a rounded trapezoid. The rounding of profiles having sharp changes in slope is in general due to diffusion of dopant from a higher to a lower region of dopant concentration. An example of this embodiment is set forth below.

Another aspect of the invention is a single mode waveguide fiber configured as in the first aspect, and having a three or four segment central core region and particular core and clad refractive index profiles that provide an effective area greater than about 60 $\mu m^2$ and a pin array bend loss less than about 65 dB, preferably less than about 30 dB, and more preferably less than about 20 dB. An embodiment of this aspect includes waveguides having an attenuation no greater than about 0.25 dB/km, typically no greater than about 0.22 dB/km, and a mode field not less than about 9 $\mu$m. In a further embodiment of this aspect of the invention the outer radius of the PLD is in the range of about 15 $\mu$m to 25 $\mu$m.

Another aspect of the invention is in accord with the first aspect and provides an effective area greater than about 60 $\mu m^2$, a pin array bend loss less than about 22 dB, and a 20 mm mandrel bend loss of less than about 11 dB/m. Embodiments of this aspect of the invention provide attenuation no greater than about 0.25 dB/km and typically are not greater than about 0.22 dB/km.

Yet another aspect of the invention is a single mode waveguide fiber made in accord with the first aspect of the invention and having a PLD of width in the range of 0.75 $\mu$m to 8 $\mu$m. The waveguide core index profile is configured for operation in the wavelength window in the range of about 1520 nm to 1650 nm. An embodiment of this aspect has the outer radius of the PLD located in the range of about 14 $\mu$m to 25 $\mu$m.

In each aspect or embodiment characterized by an attenuation level or an effective area, it will be understood that lower attenuation, less than 0.22 dB/km or 0.20 dB/km, or larger effective area, greater than 65 $\mu m^2$, 68 $\mu m^2$, 70 $\mu m^2$, 80 $\mu m^2$, or 85 $\mu m^2$, are possible and preferred.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description, serve to explain the principles and operation of the invention.

DETAILED DESCRIPTION OF THE INVENTION

Figure 1:
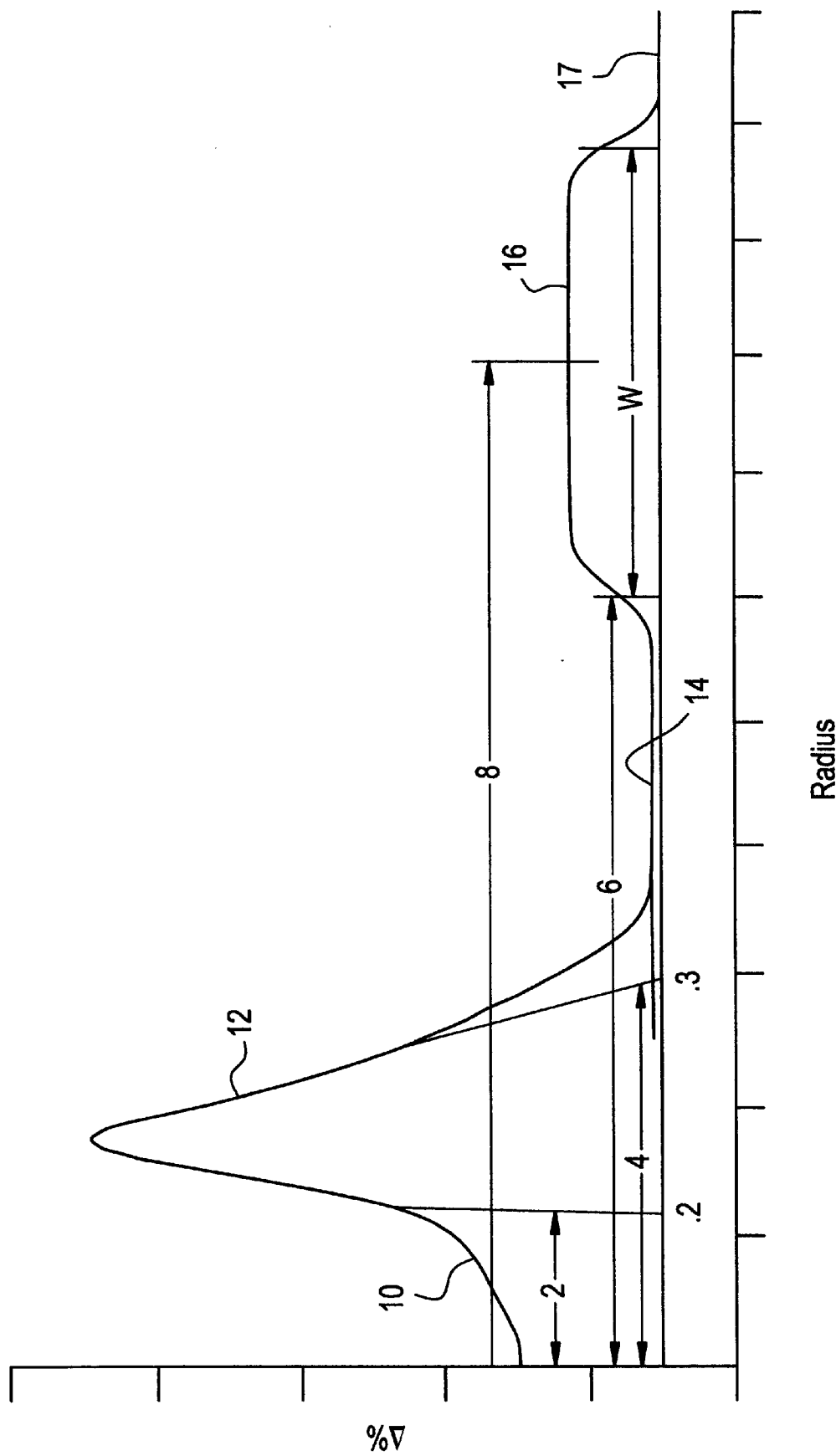
FIG. 1 is a generalized illustration of a segmented core profile that provides the definitions of radii used herein.
Figure 2:
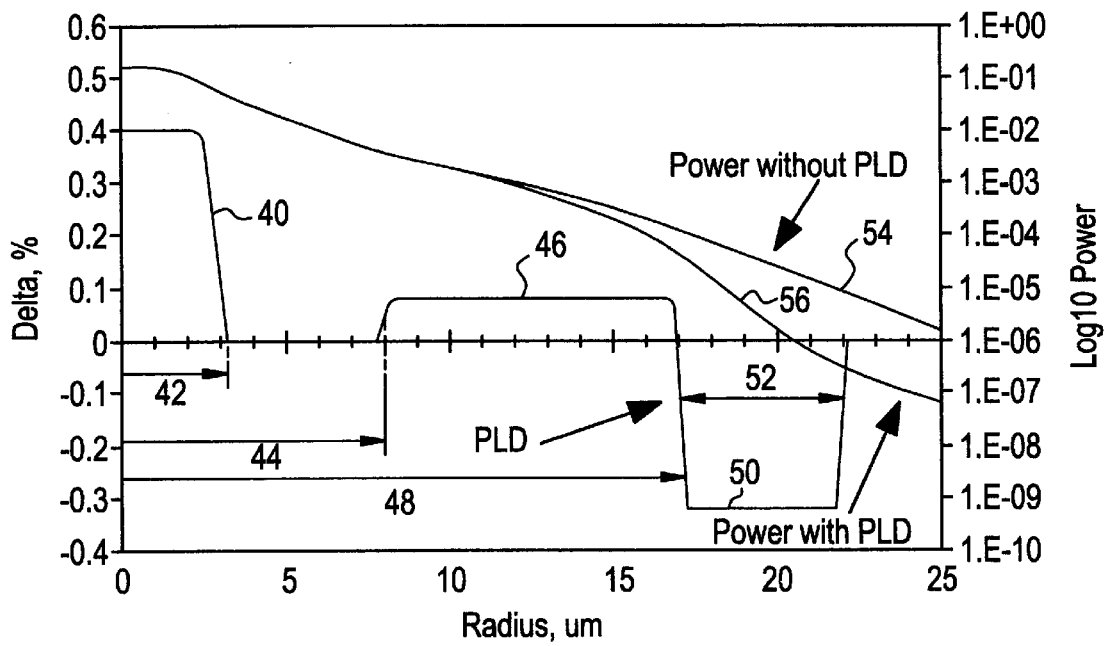
FIGS. 2 and 3 are refractive index profiles made in accordance with the invention.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of a single mode waveguide fiber of the present invention is shown in FIG. 2. Although the segments of the refractive index profile in FIG. 2 are depicted as being nearly step shaped, having sloped sides, the segments 40, 43, 46, and 50 can also have an α-profile shape or that of a rounded step index, a trapezoid, or a rounded trapezoid. The flexibility provided by a core having several segments of adjustable shape and size index profile is sufficient to allow for a plurality of combinations of waveguide properties to be achieved. The profile of FIG. 2 represents a group of profiles that produce the desired properties set forth in Example 1 below. The group is defined by the following preferred ranges of relative indexes and radii. Center segment 40 has a relative index percent, $\Delta_0\%$, in the range of about 0.35% to 0.45% and radius 42 in the range of about 3 $\mu$m to 5 $\mu$m. The first annular segment 43 has a relative index percent, $\Delta_1\%$, in the range of about 0 to 0.05% and outer radius 44 in the range of about 7 $\mu$m to 9 $\mu$m. The second annular segment 46 has a relative index percent, $\Delta_2\%$, in the range of about 0.06% to 0.20% and outer radius 48 in the range of about 9 $\mu$m to 13 $\mu$m. The relative index percent of the PLD 50, $\Delta_p\%$, has a range of about −0.05% to −0.80% and a center radius 49 in the range of about 19 $\mu$m to 21 $\mu$m. The width 52 of the PLD is in the range of about 3 $\mu$m to 10 $\mu$m. Waveguide fibers have been made using these Δ% vs. radius ranges that exhibit an effective area greater than 70 $\mu m^2$, more preferably greater than 75 $\mu m^2$, and most preferably greater than 80 $\mu m^2$, in combination with an attenuation at 1550 nm which is less than 0.25 dB/km, more preferably less than 0.22 dB/km, a total dispersion slope, over the wavelength range 1520 nm to 1650 nm, less than 0.09 $ps/nm^2$-km, more preferably less than 0.075 $ps/nm^2$-km, and a pin array bend loss which is less than 100 dB and more preferably less than 65 dB.

The invention will be further illustrated by the following example that is intended to be exemplary of the invention.

EXAMPLE 1

Referring to FIG. 2, the profile shown has respective relative indexes 40, 43, 46 and 50, $\Delta_0\%$ of 0.39%, $\Delta_1\%$ of 0, $\Delta_2\%$ of 0.085%, PLD $\Delta_p\%$ of −0.3, center segment outer radius 42 of 3.5 $\mu$m, first annular segment outer radius 44 of 8 $\mu$m, second annular segment outer radius 48 of 17 $\mu$m, center radius of the PLD 49 of 20 $\mu$m and PLD width 52 of 4 $\mu$m.

The modeled waveguide parameters are, 1550 nm total dispersion, 3.67 ps/nm-km, total dispersion slope, 0.068 ps/nm$^2$-km, mode field diameter, 10.6 $\mu$m, effective area 86.4 $\mu$m$^2$, fiber cut off wavelength 1499 nm and pin array bend loss 65 dB. Using the profile described, fibers having attenuation at 1550 nm less than 0.20 dB/km have been made. The power distribution associated with the modeled profile having a PLD area of about 1.65 $\mu$m% is shown as curve 56 in FIG. 2. The effect of the PLD is to sharply reduce the power near the edge of the core region.

Comparative Example 1

A second profile was modeled corresponding to the profile of Example 1 except that the PLD was not included. In this comparative case, the modeled waveguide parameters are, 1550 nm total dispersion, 1.18 ps/nm-km, total dispersion slope, 0.058 p-s/nm$^2$-km, mode field diameter 10.8 $\mu$m, effective area 90.3 $\mu$m$^2$, fiber cut off wavelength 2213 nm and pin array bend loss 127 dB. The power distribution associated with the modeled profile is shown as curve 54 in FIG. 2. In the absence of the PLD, power at the core edge is relatively high, a characteristic which results in the pin array macrobend loss being a factor of about 2 higher than that of the PLD profile. The respective power ratios formed by dividing power at 25 $\mu$m from centerline by that at 10 $\mu$m for respective power curves 56 and 54 are 3×10$^{-5}$ and 7.6×10$^{-4}$. The PLD provides an improvement of more than an order of magnitude, thereby reducing macrobend loss. In addition, the improvement in macrobend due to the inward shift of power is achieved without any large adverse affect on other waveguide properties.

Figure 3:
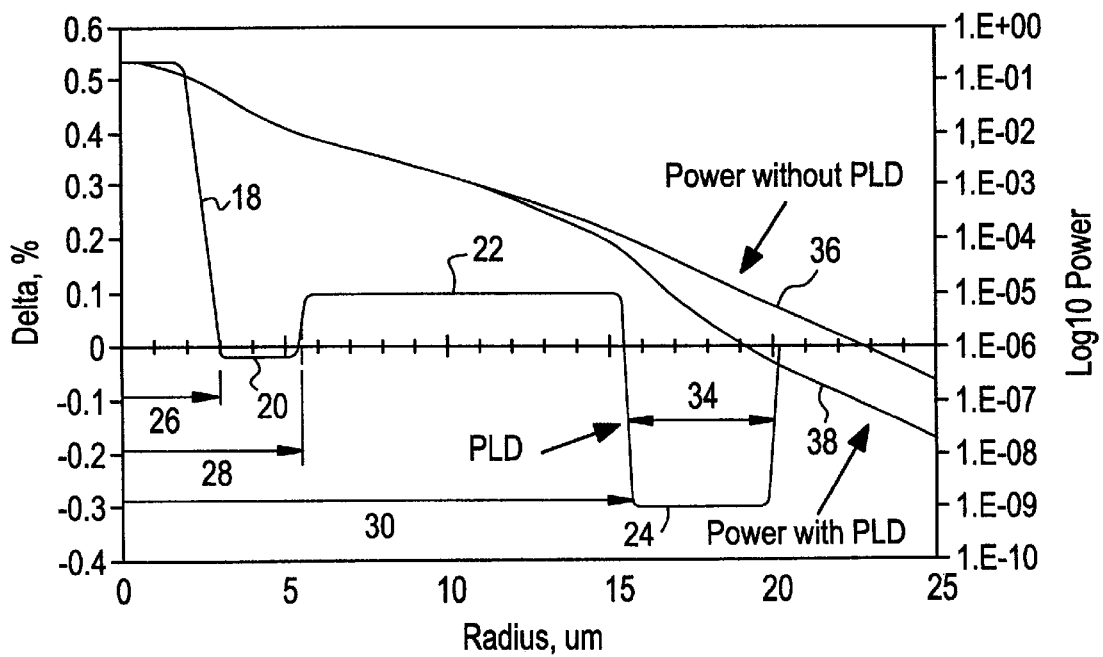

The profile of FIG. 3 represents a group of profiles that produce the desired properties set forth in Example 2 below. This group of profiles generally has a central core region which includes three segments surrounded by a PLD. The design is particularly suited to undersea applications. Here again the profiles of the respective core segments may take any of the shapes set forth above in the discussion of FIG. 2. The group is defined by the following preferred ranges of relative indexes and radii. Center segment 18 has a relative index percent, $\Delta_0\%$, in the range of about 0.5% to 0.6% and outer radius 26 in the range of about 2.0 $\mu$m to 4.5 $\mu$m. Center segment 18 is surrounded by first annular segment 20 that has a relative index percent lower than that of center segment 18, $\Delta_1\%$, in the range of about −0.025% to 0.01%, and outer radius 28 in the range of about 5 $\mu$m to 9 $\mu$m. First annular segment 20 is surrounded by second annular segment 22 that has a relative index percent, $\Delta_2\%$, in the range of about 0.06% to 0.30% and outer radius 30 the range of about 11 $\mu$m to 16 $\mu$m. The relative index percent of the PLD 24, $\Delta_p\%$, has a range of about 0.05% to −0.80%, and a center radius 32 in the range of about 14 $\mu$m to 20 $\mu$m. The width 34 of the PLD is in the range of about 0.75 $\mu$m to 13 $\mu$m. Preferably $\Delta_p\%$ is in a range of about −0.2% to −0.8%, and more preferably is more negative than −0.25%.

Waveguide fibers have been made, using refractive index profiles within these $\Delta\%$ vs radius ranges, that exhibit an effective area greater than about 65 $\mu$m$^2$, more preferably greater than 68 $\mu$m$^2$, and most preferably greater than 70 $\mu$M$^2$, in combination with an attenuation at 1550 nm which is less than 0.25 dB/km, preferably less than 0.23 dB/km, and more preferably less than 0.21 dB/km, a total dispersion slope, over the wavelength range 1520 nm to 1650 nm, of less than 0.09 ps/nm$^2$-km, more preferably less than 0.08 ps/nm$^2$-km, and a pin array bend loss of less than 50 dB, preferably less than 35 dB, and more preferably less than 30 dB. Microbend loss is less than about 5 dB/m and preferably less than 3.3 dB/m. Waveguide fibers have been made using this refractive index profile which exhibit an attenuation at 1550 nm of less than about 0.22 dB/km. Total dispersion at 1550 nm can be made to have a positive or negative value by placement of the zero dispersion wavelength. Cabled cut off values are typically less than about 1500 nm.

The invention will be further illustrated by the following example that is intended to be exemplary of the invention.

EXAMPLE 2

Referring to FIG. 3, the profile shown has respective relative indexes 18, 20, 22 and 24, $\Delta_0\%$ of 0.54%, $\Delta_1\%$ of −0.02%, $\Delta_2\%$ of 0.1%, PLD $\Delta_{p\%\ of}$ −0.3%, center segment radius 26 of 3.0 $\mu$m, first annular segment outer radius 28 of 5.5 $\mu$m, second annular segment outer radius 30 of 16 $\mu$m, center radius of the PLD 24 of 18 $\mu$m and PLD width 34 of 4 $\mu$m.

The modeled waveguide parameters are, 1550 nm total dispersion, −2.91 ps/nm-km, total dispersion slope, 0.077 ps/nm$^2$-km, over the range of 1520 $\mu$m to 1650 $\mu$m, mode field diameter 9.54 $\mu$m, effective area 70.4 $\mu$m$^2$, fiber cut off wavelength 1675 $\mu$m and pin array bend loss 19 dB. Waveguide fibers made having this index profile exhibited attenuation at 1550 $\mu$m less than 0.22 dB/km. The power distribution associated with the modeled profile is shown as curve 38 in FIG. 2. The effect of the PLD is to significantly reduce the power near the edge of the core region, thereby improving macrobend performance.

Comparative Example 2

A second profile was modeled corresponding to the profile of Example 2 except that the PLD was not included. In this comparative case, the modeled waveguide parameters are, 1550 $\mu$m total dispersion, −4.96 ps/nm-km, total dispersion slope, over the range of 1520 $\mu$m to 1650 $\mu$m, of 0.068 ps/nm$^2$-km, mode field diameter 9.65 $\mu$m, effective area 72.4 $\mu$m, fiber cut off wavelength 2333 $\mu$m and pin array bend loss 31 dB. The power distribution associated with the modeled profile is shown as curve 36 in FIG. 2. In the absence of the PLD, power at the core edge is relatively high, a characteristic which results in the pin array macrobend loss being a factor of about 1.65 higher than that of the profile having the PLD. The respective power ratios formed by dividing power at 25 $\mu$m from centerline by power at 10 $\mu$m from centerline, taken from respective power curves 38 and 36, are 1.4×10$^{-5}$ and 1.6×10$^{-4}$, an improvement of about an order of magnitude. This improvement in macrobend loss is achieved without adversely affecting the other waveguide properties.

Figure 5:
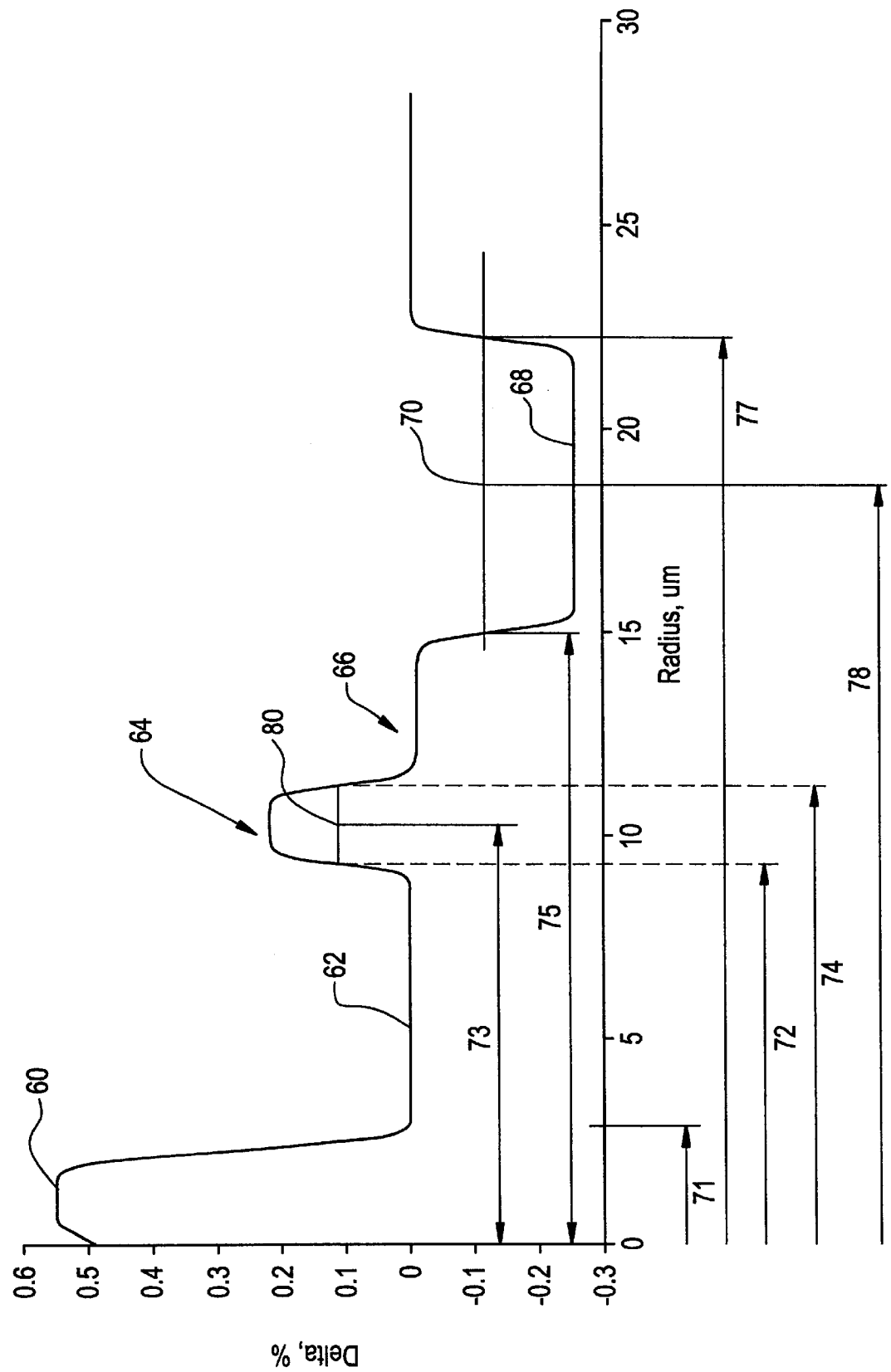
FIG. 5 is a chart of a refractive index profile made in accord with the invention wherein the central region of the core has four segments.

The profile of FIG. 5 represents a group of profiles that produce the desired properties set forth in Example 3 below. This group of profiles generally has a central region of the core that includes four segments surrounded by a PLD. The design is preferred for undersea applications. Here again the profiles of the respective core segments may take any of the shapes set forth above in the discussion of FIG. 2, and preferably the various segments fall within the following preferred ranges of relative indexes and radii. Center segment 60 has a relative index percent, $\Delta_0\%$, in the range of about 0.53% to 0.65% and outer radius 71 in the range of about 2.0 µm to 2.5 µm. Center segment 60 is surrounded by first annular segment 62 that has a relative index percent lower than that of center segment 60, $\Delta^1\%$, preferably in the range of about 0 to 0.065%. The outer radius 72 of segment 62 is determined by the outer radius 74 and width 80 of second annular segment 64. First annular segment 62 is surrounded by second annular segment 64 that has a relative index percent, $\Delta_2\%$, in the range of about 0.10% to 0.70% and center radius 73 in the range of about 8.8 µm to 11.8 µm and width 80 in the range of about 0.30 µm to 9.0 µm. Third annular segment 66 surrounds second annular segment 64 and has a relative index in the range of about 0 to 0.05% and an outer radius 75 in the range of about 14.5 µm to 16.5 µm. The relative index percent of the PLD 68, $\Delta_p\%$, has a range of about −0.05% to −0.80%, an inner radius 75 in the range of 12 µm to 19.5 µm and an outer radius 77 in the range of 17 µm to 25 µm. The maximum width of the PLD is therefore 13 µm. A preferred range of PLD width is from 3 to 10 µm, although PLD width can take on values in the range of about 0.75 µm to 13 µm. Relative index percent $\Delta_p\%$ is in a range of about −0.2% to −0.8%, and more preferably is more negative than −0.20%.

In another embodiment, the profile of FIG. 5 represents a group of profiles that produce the desired properties set forth in Example 3 below. This group of profiles generally has a central core region which includes four segments surrounded by a PLD. The design is particularly suited to undersea applications. Here again the profiles of the respective core segments may take any of the shapes set forth above in the discussion of FIG. 2, and preferably the various segments fall within the following preferred ranges of relative indexes and radii. Center segment 60 has a relative index percent, $\Delta_0\%$, in the range of about 0.5% to 0.6% and outer radius 71 in the range of about 2.4 µm to 3.0 µm. Center segment 60 is surrounded by first annular segment 62 that has a relative index percent lower than that of center segment 60, $\Delta_1\%$, in the range of about 0 to 0.1%, and outer radius 72 in the range of about 8.4 µm to 9.7 µm. First annular segment 62 is surrounded by second annular segment 64 that has a relative index percent, $\Delta_2\%$, in the range of about 0.20% to 0.30% and outer radius 74 the range of about 10.3 µm to 12.6 µm. Third annular segment 66 surrounds second annular segment 64 and has a relative index in the range of about 0 to 0.05 and an outer radius 75 in the range of about 14.5 µm to 16.5 µm. The relative index percent of the PLD 68, $\Delta_p\%$, has a range of about −0.05% to −0.80%, and a center radius 78 in the range of about 16.5 µm to 20.2 µm. The width 70 of the PLD in this embodiment is in the range of about 6.4 µm to 7.9 µm, although as is stated above, the PLD width can have values in the range of about 0.75 µm to 13 µm. Preferably $\Delta_p\%$ is preferably in a range of about −0.2% to −0.8%, and more preferably is more negative than −0.20%.

EXAMPLE 3

Referring to FIG. 5, the profile shown has respective relative indexes 60, 62, 64 and 66, $\Delta_0\%$ of 0.55%, $\Delta_1\%$ of 0.01%, $\Delta_2\%$ of 0.225%, $\Delta_3\%$ of 0, PLD $\Delta_p\%$ of −0.25%, center segment outer radius 71 of 2.37 µm, first annular segment outer radius 72 of 8.8 µm, second annular segment outer radius 74 of 11.4 µm, third annular segment 66 outer radius of 15 µm, center radius of the PLD 78 of 18.3 µm and PLD width 70 of 7.1 µm.

Waveguide fibers made in accordance with this profile exhibit 1560 nm total dispersion of −2.4 ps/nm-km, total dispersion slope of 0.079 ps/nm²-km, mode field diameter of 9.36 µm, effective area of 67.4 µm², cabled cut off wavelength of 1378 nm and pin array bend loss of 29.6 dB. Using the profile described, fibers having attenuation at 1550 nm less than 0.22 dB/km have been made and typical 1550 nm attenuation is 0.204 dB/km. Microbend loss for this exemplary case is about 3.32 dB/m.

In any of the embodiments set forth above, microbend loss can be significantly reduced, typically to values less than about 1 dB/m, when a larger diameter polymer coating is used in combination with any of the embodiments disclosed and described hereinabove. An embodiment of the larger diameter coating is one in which a dual layer coating is used on a waveguide fiber having a diameter of 125 µm. The primary or first layer has a diameter of 190 µm+/−10 µm and the secondary layer has a diameter of 285 µm+/−10 µm. The upper limit on coating outside diameter is set by practical considerations such as cost and ease of cabling. A reasonable upper limit on coating diameter is about 310 µm for a 125 µm glass fiber diameter. Microbend loss can be improved by using a coating having a secondary layer diameter targeted as low as 260 µm+/−10 µm. A typical fiber optic polymer coating is a dual layer urethane acrylate based material, having a modulus less than 1.0 MPa for the primary layer and a modulus greater than 650 MPa for the secondary layer. In one embodiment the primary layer has modulus in the range of about 1.0 MPa to 1.3 MPa and the secondary layer has modulus in the range of about 650 MPa to 850 Mpa.

EXAMPLE 4

A waveguide fiber having parameters in accordance with those of example 3 and a polymer coating surrounding the clad layer having a larger diameter as set forth immediately above was made and measured. The measured parameters were, 1560 nm total dispersion, −2.3 ps/nm-km, total dispersion slope, 0.078 ps/nm²-km, mode field diameter, 9.25 µm, effective area 66 µm², cabled cut off wavelength 1435 nm, pin array bend loss 4.7 dB, attenuation at 1550 nm 0.196, and microbend loss 0.64 dB/m.

Figure 4:
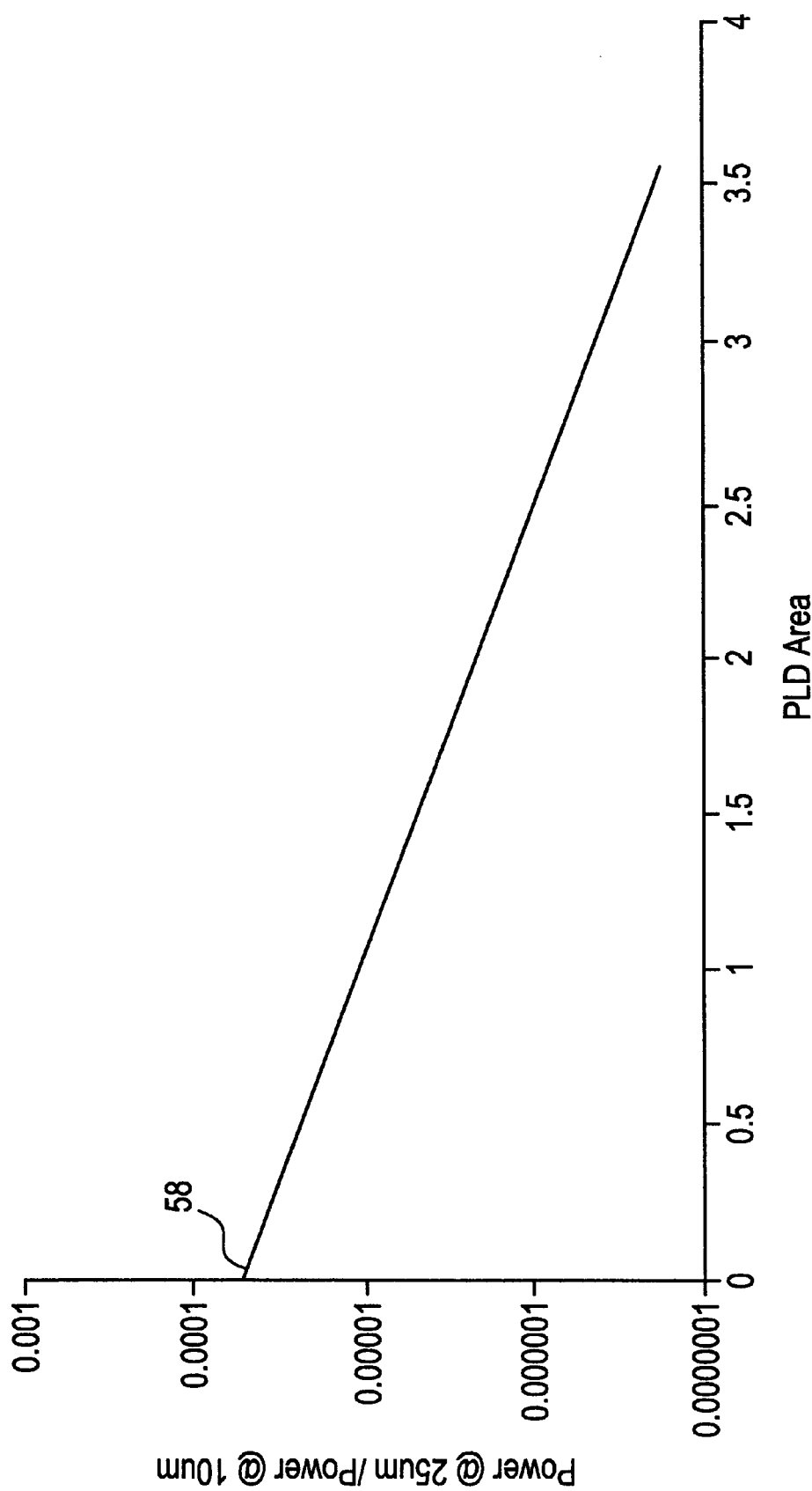
FIG. 4 is a chart showing the dependence of power ratio on PLD area.

The invention as set forth in this specification may be applied to essentially any refractive index profile to achieve improved bend resistance without substantially changing the other waveguide fiber properties. Curve 58 in FIG. 4 illustrates the change in 25 µm to 10 µm power ratio as the PLD area is increased. Curve 58 is a best fit to a series of points generated using different index profiles. For lower PLD values, those less than about 1, the spread of power ratio data points about the fitted line is 7×10⁻⁵. At higher PLD areas, the spread in power ratio is about 2.2×10⁻⁵. As the PLD area increases the improvement in macrobend loss becomes less dependent upon the details of the core segments that are inside the PLD segment. The benefits of the invention are available for a large number of profiles that are designed for use in the 1250 nm to 1700 nm wavelength band.

It will be apparent to those skilled in the art that various modifications and variations of the present invention can be made without departing from the spirit and scope of the invention. Thus, it is intended that the present invention include the modifications and variations of this invention provided they come within the scope of the appended claims and their equivalents.

What is claimed is:

1. A single mode optical waveguide fiber comprising:
a core region surrounded by and in contact with a clad layer, wherein the core region and the clad layer each have respective refractive index profiles and are configured to guide light through the waveguide fiber; wherein,
the core region comprises a central region having three segments, each said segment having respective refractive index profiles, inner and outer radii, and relative index percents, beginning at the waveguide center and counting outwards, which are positive and designated $\Delta_0\%$, $\Delta_1\%$, and $\Delta_2\%$, and, $\Delta_0\% > \Delta_2\% > \Delta_1\%$, and, surrounding said central region, a power-limiting depression having an inner and an outer radius, and,
the light guided through the waveguide fiber has a power distribution at 1550 nm characterized in that the ratio of power at the 25 $\mu$m radius point of the waveguide to the power at the 10 micron radius point is less than about $1\times10^{-4}$.

2. The single mode waveguide of claim 1 wherein said fiber exhibits an attenuation less than or equal to about 0.22 dB/km.

3. The single mode waveguide of claim 1 wherein the fiber is designed to operate in a wavelength range of about 1250 nm to 1700 nm.

4. The single mode waveguide of claim 1 wherein the fiber is designed to operate in a wavelength range of about 1520 nm to 1650 nm.

5. The single mode waveguide of claim 1 wherein the power-limiting depression has a width in the range of about 0.75 $\mu$m to 13 $\mu$m, an inner radius not less than about 12 $\mu$m, and a relative refractive index in the range of about $-0.05\%$ to $-0.80\%$.

6. The single mode waveguide of claim 5 wherein the power-limiting depression has a radius from the waveguide centerline to the power-limiting depression geometric center in the range of about 12.5 $\mu$m to 22 $\mu$m.

7. The single mode waveguide of any one of the preceding claims wherein the effective area is not less than about 60 $\mu$m$^2$ and the fiber cutoff wavelength is in the range of about 1450 $\mu$m to 1900 $\mu$m.

8. The single mode waveguide of claim 1 wherein,
the respective refractive index profiles of the central core region segments are selected from the group consisting of an $\alpha$-profile, a step, a rounded step, a trapezoid, and a rounded trapezoid.

9. The single mode waveguide of claim 8 wherein and the relative index of the power-limiting depression, $\Delta_p\%$, is negative.

10. The single mode waveguide of claim 8 wherein $\Delta_0\%$ is in the range 0.35 to 0.45%, $\Delta_1\%$ is in the range of 0 to 0.05%, $\Delta_2\%$ is in the range 0.06 to 0.15%, and $\Delta_p\%$ is in the range $-0.05\%$ to $-0.80\%$.

11. The single mode waveguide of claim 10 wherein the fiber exhibits an effective area greater than or equal to 75 $\mu$m$^2$.

12. The single mode waveguide of claim 10 wherein the fiber exhibits an effective area greater than or equal to 80 $\mu$m.

13. The single mode waveguide of claim 10 wherein, beginning at the waveguide center and counting outwards, the radius of the first segment is in the range of 3 to 5 $\mu$m, the outer radius of the second segment is in the range of 7 to 9 $\mu$m, the outer radius of the third segment is in the range of 9 $\mu$m to 13 $\mu$m, the geometric center radius of the power-limiting depression is in the range of 19 $\mu$m to 21 $\mu$m, and the width of the power-limiting depression is in the range of 3 $\mu$m to 10 $\mu$m.

14. The single mode waveguide of claim 13 wherein the ratio of power at the outer radius of the power-limiting depression to the power at the 10 micron radius point is less than about $3\times10^{-5}$.

15. The single mode waveguide of claim 14 wherein the effective area is not less than about 75 $\mu$m$^2$.

16. The single mode waveguide of claim 1 wherein,
said central region further comprises a fourth segment having a refractive index profile, an inner and outer radii, and relative index percent $\Delta_3\%$ wherein,
the respective refractive index profiles of said segments are selected from the group consisting of an $\alpha$-profile, a step, a rounded step, a trapezoid, and a rounded trapezoid, and, $\Delta_0\% > \Delta_2\% > \Delta_1\% \geq \Delta_3\%$.

17. The single mode waveguide of claim 16 wherein and the relative index of the power-limiting depression, $\Delta_p\%$, is negative.

18. The single mode waveguide of claim 16 wherein $\Delta_0\%$ is in the range 0.53% to 0.65%, $\Delta_1\%$ is in the range of 0 to 0.065%, $\Delta_2\%$ is in the range 0.10% to 0.70%, $\Delta_3\%$ is in the range of 0 to 0.05%, and $\Delta_p\%$ is in the range $-0.05\%$ to $-0.80\%$.

19. The single mode waveguide of claim 18 wherein the fiber exhibits an effective area greater than or equal to 65 $\mu$m$^2$.

20. The single mode waveguide of claim 18 wherein the fiber exhibits an effective area greater than or equal to 70 $\mu$m$^2$.

21. The single mode waveguide of claim 18 wherein, beginning at the waveguide center and counting outwards, the radius of the first segment is in the range of 2.0 $\mu$m to 2.5 $\mu$m, the center radius of the third segment is in the range of 8.8 $\mu$m to 11.8 $\mu$m, the width of the third segment is in the range of 0.30 $\mu$m to 9 $\mu$m, the inner radius of the power-limiting depression is in the range of 12 $\mu$m to 19.5 $\mu$m, and the outer radius of the power-limiting depression is in the range of 17 $\mu$m to 25 $\mu$m.

22. The single mode waveguide of claim 21 wherein the ratio of power at the outer radius of the power-limiting depression to the power at the 10 micron radius point is less than about $8\times10^{-5}$.

23. The single mode fiber of claim 16 wherein $\Delta_0\%$ is in the range 0.50% to 0.60%, $\Delta_1\%$ is in the range of 0 to 0.10%, $\Delta_2\%$ is in the range 0.20% to 0.30%, $\Delta_3\%$ is in the range of 0 to 0.05%, and $\Delta_p\%$ is in the range $-0.05\%$ to $-0.80\%$.

24. The single mode fiber of claim 23 wherein $\Delta_p\%$ is in a range of about $-0.2\%$ to $-0.8\%$.

25. The single mode fiber of claim 24 wherein $\Delta_p\%$ is more negative than $-0.25\%$.

26. The single mode fiber of claim 23 wherein beginning at the waveguide center and counting outwards, the outer radius of the first segment is in the range of 2.4 $\mu$m to 3.0 $\mu$m, the outer radius of the second segment is in the range of 8.4 $\mu$m to 9.7 $\mu$m, the outer radius of the third segment is in the range of 10.3 $\mu$m to 12.6 $\mu$m, the outer radius of the fourth segment is in the range of 14.5 $\mu$m to 16.5 $\mu$m, center radius of the power-limiting depression is in the range of 16.5 $\mu$m to 20.2 $\mu$m, and the width of the power limiting depression is in the range of about 0.75 $\mu$m to 13 $\mu$m.

27. A single mode optical waveguide fiber comprising:
a core region surrounded by and in contact with a clad layer, wherein the core region and the clad layer each have respective refractive index profiles and are configured to guide light through the waveguide fiber; wherein, the core region comprises a central region having three segments, each said segment having respective refractive index profiles, inner and outer radii, and relative index percents, beginning at the waveguide center and counting outwards, and designated $\Delta_0\%$, $\Delta_1\%$, and $\Delta_2\%$, and, $\Delta_0\% > \Delta_2\% > \Delta_1\%$, and, surrounding said central region, a power-limiting depression having an inner and an outer radius: and, wherein, $\Delta_0\%$ is in the range 0.5 to 0.6%, $\Delta_1\%$, in the range of about −0.025% to 0.01%, $\Delta_2\%$ is in the range 0.06 to 0.30%, and $\Delta_p\%$ is in the range −0.05% to −0.80%, and beginning at the waveguide center and counting outwards, the outer radius of the first segment is in the range of 2.0 to 4.5 µm, the outer radius of the second segment is in the range of 5 to 9 µm, the outer radius of the third segment is in the range of 11 µm to 16 µm, the geometric center radius of the power-limiting depression is in the range of 14 µm to 20 µm, and the width of the power-limiting depression is in the range of 3 µm to 10 µm.

28. The single mode waveguide of claim 27 wherein the effective area is not less than about 65 µm².

29. The single mode waveguide of claim 28 wherein the ratio of power at the outer radius of the power-limiting depression to the power at the 10 micron radius point is less than about $1.4 \times 10^{-5}$.

30. A single mode optical waveguide fiber comprising:

a core region surrounded by and in contact with a clad layer, wherein the core region and the clad layer each have respective refractive index profiles and are configured to guide light through the waveguide fiber; wherein, the core region comprises a central region having three segments each said segment having respective refractive index profiles, inner and outer radii, and relative index percents, beginning at the waveguide center and counting outwards, which are positive and designated $\Delta_0\%$, $\Delta_1\%$, and $\Delta_2\%$, and, $\Delta_0\% > \Delta_2\% > \Delta_1\%$, and, a power-limiting depression having an outer radius; and, the effective area is not less than about 60 µm² and the pin array bend loss is less than about 65 dB.

31. The single mode waveguide of claim 30 wherein the attenuation is no greater than about 0.25 dB/km.

32. The single mode waveguide of claim 31 wherein the mode field diameter is greater than about 9 µm.

33. The single mode waveguide of claim 30 wherein the outer radius of said power-limiting depression is in the range of about 14 µm to 25 µm.

34. A single mode optical waveguide fiber comprising:

a core region surrounded by and in contact with a clad layer, wherein the core region and the clad layer each have respective refractive index profiles and are configured to guide light through the waveguide fiber; wherein the core region comprises a central region having three segments, each said segment having respective refractive index profiles, inner and outer radii, and relative index percents, beginning at the waveguide center and counting outwards, which are positive and designated $\Delta_0\%$, $\Delta_1\%$, and $\Delta_2\%$, and, $\Delta_0\% > \Delta_2\% > \Delta_1\%$, and, a power-limiting depression having an outer radius; and, effective area is not less than about 60 µm², the pin array bend loss is less than about 22 dB, and the 20 mm mandrel bend loss is less than about 11 dB/m.

35. The single mode waveguide of claim 34 wherein the attenuation is no greater than about 0.25 dB/km.

36. A single mode optical waveguide fiber comprising:

a core region surrounded by and in contact with a clad layer, wherein the core region and the clad layer each have respective refractive index profiles and are configured to guide light through the waveguide fiber; wherein, the core region comprises a central region having three segments, each said segment having respective refractive index profiles, inner and outer radii, and relative index percents, beginning at the waveguide center and counting outwards, which are positive and designated $\Delta_0\%$, $\Delta_1\%$, and $\Delta_2\%$, and, $\Delta_0\% > \Delta_2\% > \Delta_1\%$, and, surrounding said central region a power-limiting depression having a width in the range of 0.75 µm to 13 µm; and, said respective index profiles of the core and clad are designed to guide signals in the wavelength range 1520 nm to 1650 nm.

37. The single mode waveguide of claim 36 wherein the power-limiting depression has an outer radius measured from the waveguide centerline in the range of about 14 µm to 25 µm.

38. The single mode waveguide of claim 36 wherein the effective area is not less than about 60 µm².

39. The single mode waveguide of any one of claims 1–6 or 8–38 wherein the fiber cut-off wavelength is in the range of about 1450 nm to 1900 nm.

40. The single mode waveguide of any one of claims 1–6 or 8–38 wherein the fiber further comprises at least one polymer coating surrounding the clad layer having a diameter in the range of 250 µm to 310 µm.

* * * * *

UNITED STATES PATENT AND TRADEMARK OFFICE
CERTIFICATE OF CORRECTION

PATENT NO. : 6,317,551 B1
DATED : November 13, 2001
INVENTOR(S) : Brian E. Mitchell and David K. Smith Page 1 of 1

It is certified that error appears in the above-identified patent and that said Letters Patent is hereby corrected as shown below:

Column 11,
Line 60, "$\mu m$" should be corrected to read -- $\mu m^2$ --

Signed and Sealed this

Twenty-third Day of April, 2002

Attest:

JAMES E. ROGAN
*Attesting Officer*  *Director of the United States Patent and Trademark Office*